3,823,120
PREPARATION AND USES OF N-(ω-AMINOALKYL)-2-AMINOETHANE SULFONIC ACIDS AS CATIONIC DYEABLE ADDITIVES TO POLYAMIDES

Morris Benjamin Berenbaum and Allen Walter Sogn, Williamsville, N.Y., assignors to Allied Chemical Corporation, New York, N.Y.
No Drawing. Filed Sept. 6, 1972, Ser. No. 286,628
Int. Cl. C08g 20/20
U.S. Cl. 260—78 R       4 Claims

ABSTRACT OF THE DISCLOSURE

Preparation and uses of new compounds of N-(ω-aminoalkyl)-2-aminoethane sulfonic acids, especially N-(6-aminohexyl)-2-aminoethane sulfonic acid is disclosed. The compounds can be used in nylon yarn to make it dyeable with cationic dyes.

BACKGROUND OF THE INVENTION

This invention relates to the preparation and uses of the new compounds, N-(ω-aminoalkyl)-2-aminoethane sulfonic acids in nylon as an additive to provide dye sites for cationic dyes.

It is known in the prior art to use compounds which have depending sulfonic acid, or its salt, moieties incorporated into nylon polymers in order to create dye sites for cationic dyes. The following is a list of patents pertinent to the background of this invention: U.S. 3,454,535 to Bodesheim, U.S. 3,184,436 to Magat, U.S. 3,389,549 to David, U.S. 3,505,165 to Kubitcek, U.S. 3,296,204 to Caldwell. The Magat, David and Caldwell patent are all limited to linking the sulfonic acid or salt moiety to the polyamide backbone chain with aromatic compounds. Bodesheim and Kubitcek are limited to linking the sulfonic acid or salt moiety to the polyamide backbone with an alkyl group having 4 to 6 carbon atoms. For example, see Bodesheim, column 1, line 31. Thus, the prior art is silent as to the lower alkyl groups as linking agents between the sulfonic moiety and the polyamide polymer backbone chain. Applicants have discovered that using an alkyl group of three carbon atoms to link the sulfonic moiety is not useful and turns the polyamide polymer brown. Also, using a one-carbon alkyl, namely, methane, also makes brown polymer. However, the two carbon-linking group of this invention in the N-(ω-aminoalkyl)-2-aminoethane sulfonic acids, is useful as shown in the following examples.

SUMMARY OF THE INVENTION

A new series of compounds and their preparation and their use in polyamide fibers to make dye sites for cationic dyes has been discovered. The compounds are N-(ω-aminoalkyl)-2-aminoethane sulfonic acids having the formula $NH_2(CH_2)_yNHCH_2CH_2$—$SO_3M$ where M is H or an alkali metal and y is 2 to 12. Of special interest is N-(6-aminohexyl)-2-aminoethane sulfonic acid where M is hydrogen and y is 6. The method of preparing these compounds comprises reacting an alkylene diamine with 2-chloroethane sulfonic acid sodium salt in the solvent at a temperature between 75° C. and 130° C. The method to react the preferred N-(6-aminohexyl)-2-aminoethane sulfonic acid is the reaction of hexanediamine with the 2-chloroethane sulfonic acid, sodium salt.

These compounds, when incorporated into a polyamide by mixing with the monomer during reaction and spun, form a filament of synthetic linear polyamides having recurring amide units containing from about 0.1 to 25 percent by weight of a recurring unit of the formula

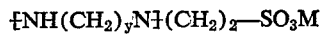

wherein y is a number between 2 and 12 and M is H or an alkali metal. In a preferred embodiment, y is 6. In another preferred embodiment, the polyamide is polycaprolactam. In the most preferred embodiment the polyamide is polycaprolactam and y is 6.

DESCRIPTION OF THE PREFERRED EMBODIMENTS

Preparation of N-(6-Aminohexyl)-2-Aminoethane Sulfonic Acid

Example 1

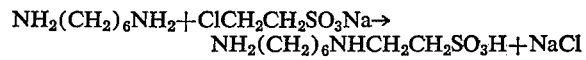

To 116 grams of hexanediamine (1 mole) in 210 ml. xylene were added 87 grams (0.523 mole) 2-chloroethane sulfonic acid sodium salt, and the mixture was heated on a steam bath to 90° C. The temperature rose due to heat of reaction to 120° C. Cooling was applied by water bath. An additional 40 grams (0.240 mole) of the 2-chloroethane sulfonic acid sodium salt were added and the mixture again heated to 90° C. and the temperature rose to 110° C. The reaction mass was held at steam bath temperature overnight and then allowed to setle forming two phases, the upper xylene phase (170 ml.) being decanted from the sirupy product. The xylene decant contained 7 grams of hexanediamine as determined by acid titration. The sirupy product was treated with 200 ml. methanol and heated to solution by refluxing. The methanol solution was filtered from by-product sodium chloride. The filtrate was evaporated on a steam bath and then dried in vacuo to constant weight. There were obtained 203 grams of glassy semi-solid having an equivalent weight of 212 by titration of the free amino group with standard HCl. The theoretical equivalent weight is 224 indicating the presence of a small amount of the excess hexanediamine. Thus, the sirupy mass was returned to the reactor and heated with an additional 21 grams (0.126 mole) of 2-chloroethane sulfonic acid sodium salt, dissolved in 250 ml. methanol, filtered from by-product NaCl and stripped in vacuo on a steam bath until alcohol free. The sirupy residue which formed a glassy semi-solid on cooling weighed 211 grams and had an equivalent weight of 238 by titration with standard HCl indicating the presence of a small mount of hexamethylene bis-2-aminoethane sulfonic acid.

Example 2

To 124.4 grams (1.075 moles) hexanediamine in 400 ml. toluene were added 160 grams (0.96 mole) 2-chloroethane sulfonic acid sodium salt and the mixture was heated on a steam bath overnight and settled. An upper toluene phase (360 ml.) was decanted from the sirupy lower layer which was twice washed with 250 ml. toluene by stirring and decantation. The residue was treated with 580 ml. methanol, heated to dissolve the product and filtered from by-product sodium chloride and stripped free of methanol in vacuo. The glassy semi-solid weighed 209.5 grams which is equivalent to 97.5% yield based on the 2-chloroethane sulfonic acid sodium salt.

Preparation of Polycaprolactam Containing Cationic Dyeable Sulfonic Acid Sites

Example 3

Seventy (70) grams of caprolactam, 1.4 grams of azelaic acid, 3.7 grams aminocaproic acid, 1.4 grams of N-(6-aminohexyl)-2-aminoethane sulfonic acid and 0.8 gram sodium bicarbonate were heated in an oil bath to 255° C. in one hour and held at 255 to 260° C. under an atmosphere of nitrogen for five hours and cooled. The resulting cationic dyeable nylon was nearly white.

Example 4 (Comparative)

When Example 1 was repeated except that an equivalent amount of N-(6-aminohexyl) - 3 - aminopropane sulfonic acid was substituted for N-(6-aminohexyl)-2-aminoethane sulfonic acid, a brown polymer was obtained.

Example 5 (Comparative)

Preparation of N-(6-Aminohexyl) Aminomethane Sulfonic acid, Sodium Salt $$CH_2O + NaHSO_3 \rightarrow HOCH_2SO_3Na$$

$$HOCH_2SO_3Na + NH_2(CH_2)_6NH_2 \rightarrow NH_2(CH_2)_6NHCH_2SO_3Na$$

To 95 grams sodium meta bisulfite (0.5 mole, equivalent to 1 mole $NaHSO_3$) in 150 ml. water were added en masse 82 grams 37% formaldehyde (1 mole). The temperature peaked to 61° C. and was held at 60 to 65° C. for 30 minutes and the solution fed into a solution of 116 grams hexanediamine (1 mole) in 200 ml. methanol. The mixture was held at 75 to 76° C. for 3 hours, cooled to 30° C., filtered and the cake washed with three 15 ml. portions of methanol. The cake was dried in vacuo at 70 to 75° C., weight 25 grams. The cloudy filtrate was cooled to 0° C. and re-filtered, and the cake was washed with 400 ml. methanol. The combined cakes were re-slurried in 200 ml., methanol, filtered and washed with two 100 ml. portions of methanol and dried in vacuo at 70 to 75° C. The dry cake weighed 98 grams.

Equivalent weight: 221.15 (Theory 234)
Sulfur: 16.8% (Theory 13)

Example 6 (Partially Comparative)

To each of three test tubes were charged 70 grams caprolactam, 3.7 grams aminocaproic acid and 1.4 grams azelaic acid.

To No. 1 added 1.9 grams N-(6-aminohexyl)-4-aminobutane sulfonic acid and 0.8 gram $NaHCO_3$ (Prior Art).

To No. 2 added 1.7 grams N-(6-aminohexyl)-2-aminoethane sulfonic acid and 0.8 gram $NaHCO_3$.

To No. 3 added 1.7 grams N-(6-aminohexyl)-aminomethane sulfonic acid, sodium salt and 0.2 gram $NaHCO_3$.

The tubes were heated in an oil bath under an atmosphere of nitrogen to 250° C. over one hour and held at 250 to 255° C. for 5 hours and cooled.

The resulting polymers from tests 1 and 2 were about equal and nearly white. Test No. 3 gave a dark brown polymer containing entrapped gas bubbles.

In view of the brown polymer obtained with the proprane (in Example 4) and methane sulfonic acid, it is suprising that the ethane sulfonic acid gives a light colored product.

Example 7

Polycaprolactam was prepared by adding to a 3-liter agitated reactor a solution of 32.4 grams of N-(6-aminohexyl) - 2 - aminoethane sulfonic acid, 32.5 grams azelaic acid 13.3 grams of sodium bicarbonate, 0.0576 gram of manganese chloride, 0.1640 gram of a 50% solution of hypophosphorous acid, and 80 grams of ω-aminocaproic acid in 1520 grams of caprolactam at 90° C. The solution was heated to 255° C. over a one hour period and held at about 255° C., with a slow nitrogen sweep across the top of the melt. After 9 hours at temperature, the polymer was extruded from the bottom of the reactor as a strand about 0.1 inch in diameter. The strand was quenched in cold water and pelletized into 0.1 inch lengths.

The pellets were given 4 one-hour water washes. The water to chip ratio was about 1.1:1.

Analysis of the polymer showed a 62.6 relative formic acid viscosity with about 72 carboxyl and 14 amine equivalents per $10^6$ grams of polymer.

This polymer and a polymer made similarly, but with 32.53 grams of 5-sulfoisophthalic acid (prior art), and 12.2 grams of m-xylylene diamine, instead of the N-(6-aminohexyl) - 2 - aminoethyl sulfonic acid and azelaic acid, were spun and drawin into yarns having a Y-cross section of 3.2 mod ratio. Eeach of the yarns were plied with an indentical end to give final yarn deniers of 2050, with 140 filaments.

The yarn with N-(6-aminohexyl) - 2 - aminoethyl sulfonic acid was found to contain 2413 p.p.m. sulfur. The yarn with 5-sulfoisophthalic acid contained 2460 p.p.m. sulfur.

These two yarns were separately knitted into sleeves and dyed completely in four different dye baths, each bath having a different basic dye. After dyeing, both yarns had the same medium depth of shade in each dye bath. Thus, it can be seen that new compound of this invention is every bit as good as the prior art additive. In spite of the fact that both of the next adjacent homologs, the $C_1$ (methane sulfonic) and $C_3$ (propane sulfonic), are inoperable because they discolor the polyamide; the compound of this invention, the $C_2$ (ethane sulfonic), is a successful cationic dyeable additive.

What is claimed is:

1. A filament of a synthetic linear polyamide having recurring amide units containing from about 0.1 to 25 percent by weight of a recurring unit of the formula

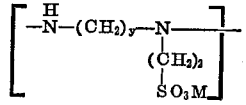

wherein $y$ is a number between 2 and 12, and M is H or an alkali metal.

2. The filament of claim 1 wherein $y$ is 6.
3. The filament of claim 1 wherein the polyamide is polycaprolactam.
4. The filament of claim 3 wherein $y$ is 6.

References Cited

UNITED STATES PATENTS 3,454,535  7/1969  Bodensheim et al. ___ 260—78 L
3,709,865  1/1973  Lofquist et al. ____ 260—78 L X LUCILLE M. PHYNES, Primary Examiner U.S. Cl. X.R.

260—78 L; 8—178 R